United States Patent
Huret et al.

[15] 3,702,080
[45] Nov. 7, 1972

[54] CYCLE GEAR CHANGE AND CYCLES EQUIPPED WITH SUCH GEAR CHANGE

[72] Inventors: Jacques Andre Huret; Roger Henri Huret, both of 60, Avenue Felix Faure, (Hauts de Seine) Nanterre, France

[22] Filed: Feb. 19, 1971

[21] Appl. No.: 117,009

[52] U.S. Cl. ........................... 74/217 B, 74/242.15 B
[51] Int. Cl. ........................... F16h 11/04, F16h 7/10
[58] Field of Search ............. 74/217 B, 242.15 B, 240

[56] References Cited

UNITED STATES PATENTS

| 3,364,763 | 1/1968 | Juy | 74/217 B |
| 3,362,238 | 1/1968 | Hayashi et al. | 74/217 B |
| 3,394,604 | 7/1968 | Kimura | 74/217 B |

Primary Examiner—Leonard H. Gerin
Attorney—Donnelly, Mentag & Harrington

[57] ABSTRACT

A cycle gear change enabling the cycle drive chain to pass from one free wheel pinion to another, these pinions having a relatively large difference in the number of teeth in order to obtain a large speed variation for the moving cycle, this gear change being fitted with a roller which may be displaced cross-wise to a cycle free wheel so as to ensure cross-wise displacement of the chain and its passage from one free wheel pinion to the other, and a second roller articulated in relation to the first so as to keep the drive chain under tension, gear change characterized by the fact that it comprises a guide pivoting freely on a spindle and straddling the portion of chain situated between the free wheel and the first roller. May be applied to all cycles.

3 Claims, 4 Drawing Figures

CYCLE GEAR CHANGE AND CYCLES EQUIPPED WITH SUCH GEAR CHANGE

SUMMARY OF THE INVENTION

The invention relates to a cycle gear change enabling the cycle drive chain to pass from one free wheel pinion to another, these pinions having a relatively large difference in the number of teeth in order to obtain a large speed variation for the moving cycle.

Cycle gear changes produced up to now cannot be used with free wheels having a large difference in diameter between the largest and smallest pinion.

Indeed, on every gear change the roller ensuring movement of the chain from one pinion to the other is positioned on a spindle which must be placed at a greater distance from the free wheel spindle than the sum of the radii of the largest free wheel pinion and the transversal displacement roller.

However, in this case, when the chain is on the smallest diameter pinion and it is desired to bring it back onto a larger diameter pinion, there is a relatively large length of chain between this smallest pinion and the transversal displacement roller, so that it is very difficult to make the chain pass accurately and swiftly from this smallest pinion to the adjoining pinion, given that this chain has lateral play which increases with wear and, also, as the length of chain between this smallest pinion and the transversal displacement roller increases.

The object of this invention is to remedy these drawbacks; for this purpose it relates to a cycle gear change comprising a roller which may be displaced cross-wise to a cycle free wheel to ensure cross-wise displacement of the chain and its passage from one free wheel pinion to the other, and a second roller articulated in relation to the first so as to keep the drive chain under tension, gear change characterized by the fact that it comprises a guide pivoting freely on a spindle and straddling the portion of chain situated between the free wheel and the first roller.

In accordance with another characteristic, the spindle receiving the freely-pivoting guide is identical with that supporting the first drive roller.

BRIEF DESCRIPTION OF THE DRAWINGS

A gear change in accordance with the invention is illustrated as a non-limiting example in the accompanying drawings, in which.

DESCRIPTION OF THE PREFERRED EMBODIMENT

The object of this invention is consequently to produce a gear change enabling large ratio changes for the drive of a cycle or like machine, that is, that this gear change enables free wheels to be used having large differences in diameter between the smallest and largest pinion.

In accordance with the invention, this gear change, which in itself may be ordinary, comprises a guide which pivots freely and is positioned to straddle the portion of chain situated between the free wheel and the drive roller for this gear change, in order to accompany the roller in its transversal movements and in this way to make the chain pass accurately and swiftly from a small diameter pinion to a larger one, in spite of the difference in diameters, this guide being, in addition, constantly oriented in the direction of the chain due to the action the latter exerts on the guide.

Figure 1:
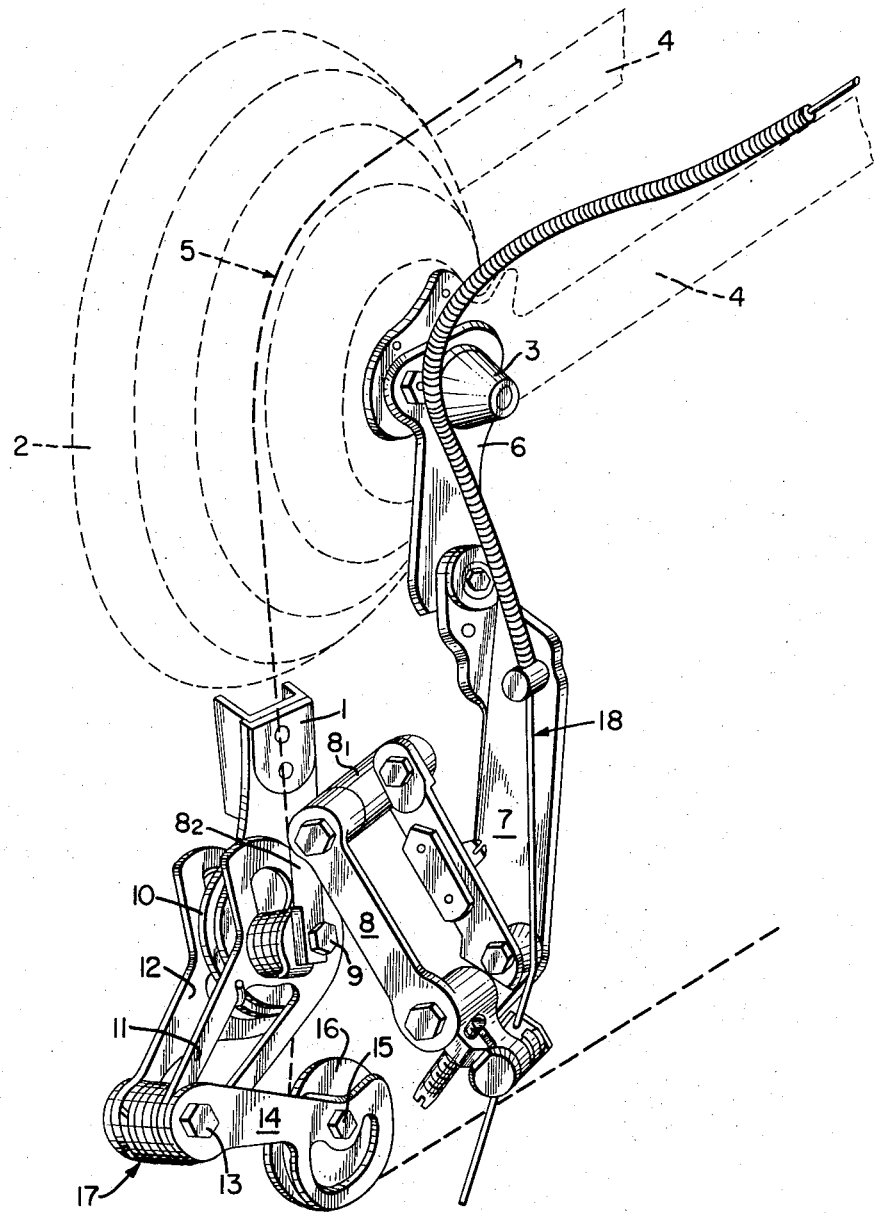
FIG. 1 shows a diagrammatic perspective view of a gear change in accordance with the invention.

In the embodiment illustrated in FIG. 1, a gear change in accordance with the invention is shown. For this purpose, it comprises the guide indicated generally by reference 1, which is mounted on a gear change; this gear change may in itself be of any construction.

This figure thus shows a cycle free wheel drive 2, fixed by nuts 3 onto the lugs at the ends of the rear fork 4 of a cycle.

A drive chain 5, which is meshed with the crank-gear teeth in a known manner, passes over one of the pinions making up this free wheel 2.

Parts 6 and 7 of the gear change are likewise fixed on one of the lugs of fork 4, part 7 comprising small articulated rods in the shape of a distortable parallelogram 8 having an extension $8_2$ on its arm $8_1$.

A screw 9 forming a pivoting spindle for a first roller 10 is positioned on this extension $8_2$. In addition, small plates 11 and 12 are positioned on this screw, straddling roller 10, and on which are articulated, by means of a spindle 13, two other small rods 14 receiving between them a second roller 16, on a spindle 15. A spring 17 is positioned around spindle 13 in order to keep chain 5 constantly under tension by means of roller 16.

The first roller 10 ensures transversal displacement of chain 5 for its passage from one pinion on free wheel 2 to the adjoining one; this displacement is obtained by means of a cable 18 actioned by a hand-lever which controls distortion of parallelogram 8 in order to move in translation the group comprising rollers 10 and 16 and supporting arms 11, 12 and 14.

In accordance with the invention, screw 9 serving as rotation spindle for the first roller, also receives guide part 1, which pivots freely. It should be noted, however, that this part 1 may be mounted to pivot on a spindle separate from spindle 9 and, for example, this guide part 1 may be mounted to pivot on a special spindle positioned on supporting arm 11.

This guide piece 1 therefore follows the transversal movements of roller 10 in order to make chain 5 pass swiftly and accurately from one free wheel pinion to the other, by preventing the portion of chain situated between this free wheel 2 and roller 10 from sagging, either because of its length, or because of the amount of play there may be between the different links in the chain depending on how worn they are.

Figure 2:
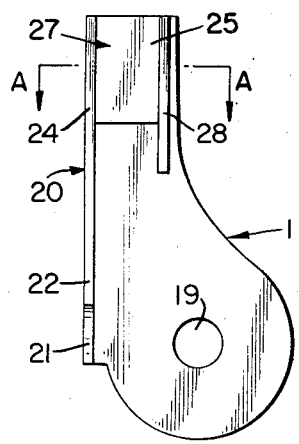
FIG. 2 is an elevation view of the chain-guiding device.
Figure 3:
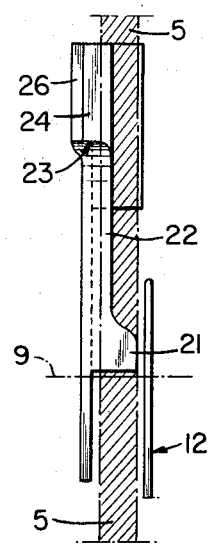
FIG. 3 is a left-hand side view of FIG. 2 to which the drive chain and one of the support plates for the gear change roller have been added diagrammatically.
Figure 4:
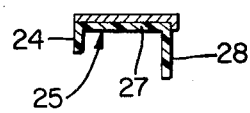
FIG. 4 is a section view along A—A in FIG. 2.

Guide 1 shown in FIGS. 2, 3 and 4 is shaped like a small metal plate with an orifice 19 to receive a pivoting spindle such as 9.

One edge 20 of this small plate is cut out and bent so as to form a flange 21 (see FIG. 3) positioned along practically the whole width of chain 5 and whose end is consequently situated close to the edge of supporting and guiding piece 12.

In this way, it is certain that this chain 5 will stay on roller 10 when the rear wheel of the cycle is removed, regardless of the orientation of the guiding piece in relation to support piece 12.

Above flange 21, edge 20 extends in a straight part 22 which is cut at 23, then extends via arm 24 of a plastic U-shaped part 25. Extension 22 and arm 24 of U-shaped part 25 are of a height such that chain 5 can only come into contact with them with one of its edges so as to be able to shorten the length of chain between free wheel 2 and roller 10, without extension 22 and arm 24 preventing the teeth of the larger diameter pinion from meshing with chain 5.

The U-shaped part 25 is made of plastic in order to produce a silent guide piece. The end of guide plate 1 is dished, at 26, in such a way that the bottom 27 of U-shaped part 25 is situated in the extension of the remaining part of plate 1.

Likewise, the second arm 28 of this U-shaped part 25 is of such a height that it guides chain 5 over practically all its width and, also, this arm 28 extends beyond the bottom part 27, in order to prevent the chain from jarring up and down.

It should be understood that the invention is not limited to the embodiments described and presented hereinabove; from these it is possible to foresee other forms and embodiments which in no way exceed the scope of the invention.

What is claimed is:

1. A cycle gear change comprising a roller which may be displaced cross-wise to a cycle free wheel to ensure cross-wise displacement of the chain and its passage from one free wheel pinion to the other, and a second roller articulated in relation to the first so as to keep the drive chain under tension, gear change characterized by the fact that it comprises a guide pivoting freely on a spindle and straddling the portion of chain situ-ated between the free wheel and the first roller.

2. A gear change in accordance with claim 1, in which the spindle receiving the freely-pivoting guide is identical with that supporting the first drive roller.

3. A gear change in accordance with claim 1, in which the guide is made up of a pivoting metal plate having flanges to straddle the chain, said metal plate being positioned, in relation to the first roller, on the side of the smallest free wheel pinion.

* * * * *

UNITED STATES PATENT OFFICE
CERTIFICATE OF CORRECTION

Patent No. 3,702,080 Dated November 7, 1972

Inventor(s) Jacques Andre Huret et al.

It is certified that error appears in the above-identified patent and that said Letters Patent are hereby corrected as shown below:

On the cover sheet insert -- [30] Claims priority, application France, October 20, 1970, 7037816 --.

Signed and sealed this 1st day of May 1973.

(SEAL)
Attest:

EDWARD M. FLETCHER, JR.
Attesting Officer

ROBERT GOTTSCHALK
Commissioner of Patents